B. F. McGLOTHLEN.
INDICATOR.
APPLICATION FILED AUG. 16, 1919.

1,380,227.

Patented May 31, 1921.
2 SHEETS—SHEET 1.

WITNESS:
R. C. Thomas

INVENTOR.
BY B. F. McGlothlen

Victor J. Evans
ATTORNEY.

B. F. McGLOTHLEN.
INDICATOR.
APPLICATION FILED AUG. 16, 1919.
1,380,227.
Patented May 31, 1921.
2 SHEETS—SHEET 2
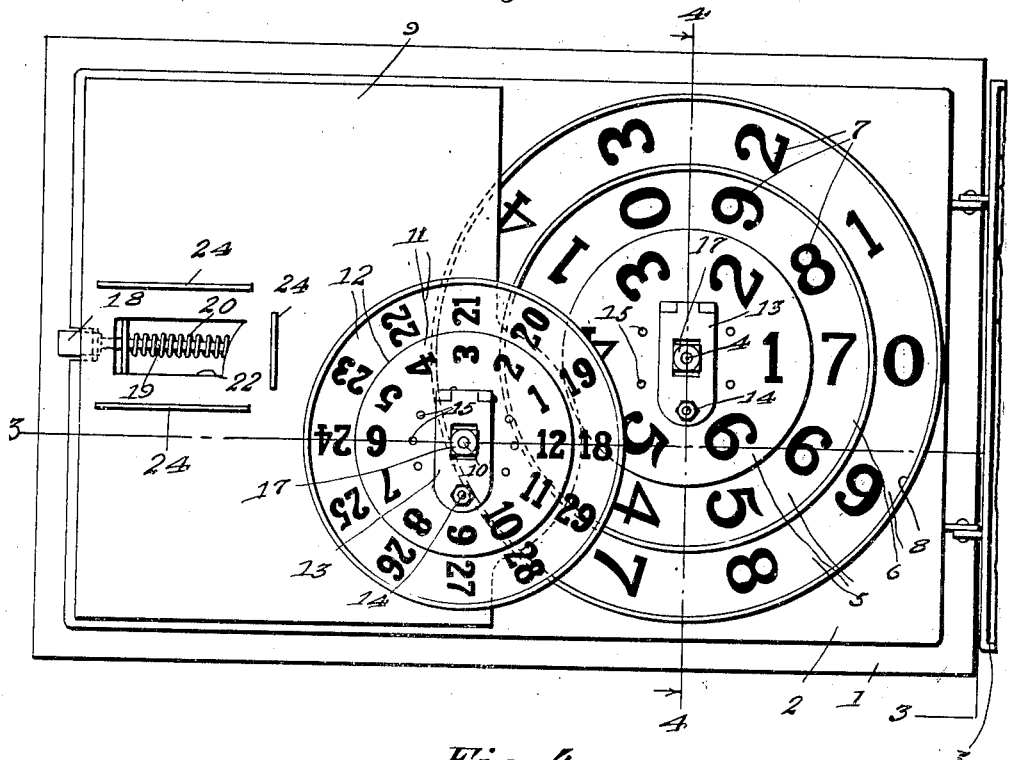
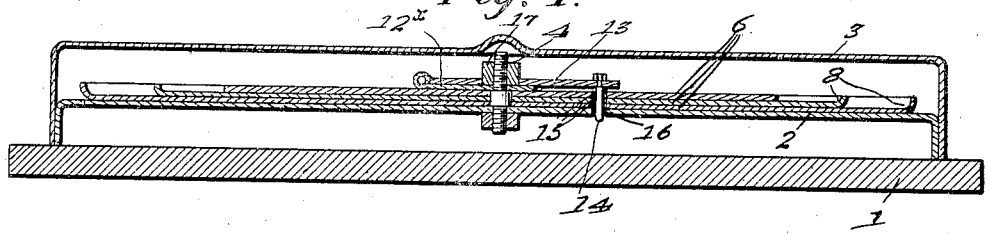
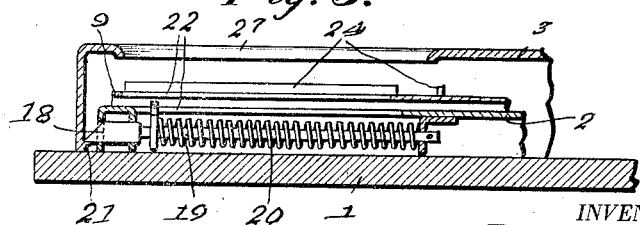
WITNESS:
R. C. Thomas
INVENTOR.
BY B. F. McGlothlen
Victor J. Evans
ATTORNEY.

UNITED STATES PATENT OFFICE.

BARTON F. McGLOTHLEN, OF SAN BERNARDINO, CALIFORNIA.

INDICATOR.

1,380,227.     Specification of Letters Patent.     Patented May 31, 1921.

Application filed August 16, 1919. Serial No. 317,994.

*To all whom it may concern:*

Be it known that I, BARTON F. McGLOTHLEN, a citizen of the United States, residing at San Bernardino, in the county of San Bernardino and State of California, have invented new and useful Improvements in Indicators, of which the following is a specification.

This invention relates to a tare weight indicator adapted for use with freight or passenger cars, auto trucks or similar vehicles, where it is desirable or necessary to indicate the light or unloaded weight of such vehicle or the like, in order that the load limit may not be exceeded.

It is customary, particularly in freight cars, to indicate the tare or light weight on the side of the car by painting or otherwise affixing the numerals indicating such light weight thereto. This manner of indicating the tare weight is generally carried out at some time subsequent to the actual weighing, and usually by some one other than the actual weight-master. This permits the unauthorized variation from the actual tare weight, if deception is desired. The present invention is designed to avoid this possibility, and to provide an indicator which may be set and sealed by the weight-master, at the moment the weighing is completed, and which cannot subsequently be tampered with, without visible indication of such unauthorized attempt.

The present indicator comprises a case, having a series of dials, arranged therein, which may be adjusted to denote through a cover for the case the numbers indicating the tare weight of the particular vehicle. The cover is adapted to be locked in closed position, to prevent unauthorized tampering with the dials, and provision is made whereby the dials are secured in relative position following their adjustment. The locking means for the cover is accessible through an opening in the cover, and following the adjustment of the dials by the weight-master, a card is arranged to seal the opening in the cover through which the locking means is accessible. This card may be inscribed with any suitable data as the date of the weighing and the name of the weight-master or place of weighing, and as the locking means is not accessible except through the opening protected by the card, it is apparent that to unlock the cover and change the dial, the card must be destroyed. This at once gives evidence of the tampering with the device, so that proper and necessary action may be taken.

The invention is illustrated in the accompanying drawings, in which:—

Fig. 2 is a similar view with the cover raised and the dials exposed.

Fig. 4 is a detail of the means for holding the dials of one set in relatively fixed position following their adjustment, said view taken on the line 4—4 of Fig. 2.

Fig. 5 is a detail of the locking means for the cover, showing particularly the support for the sealing card.

Similar numerals of reference designate corresponding parts in all of the views of the drawings.

Figure 1:
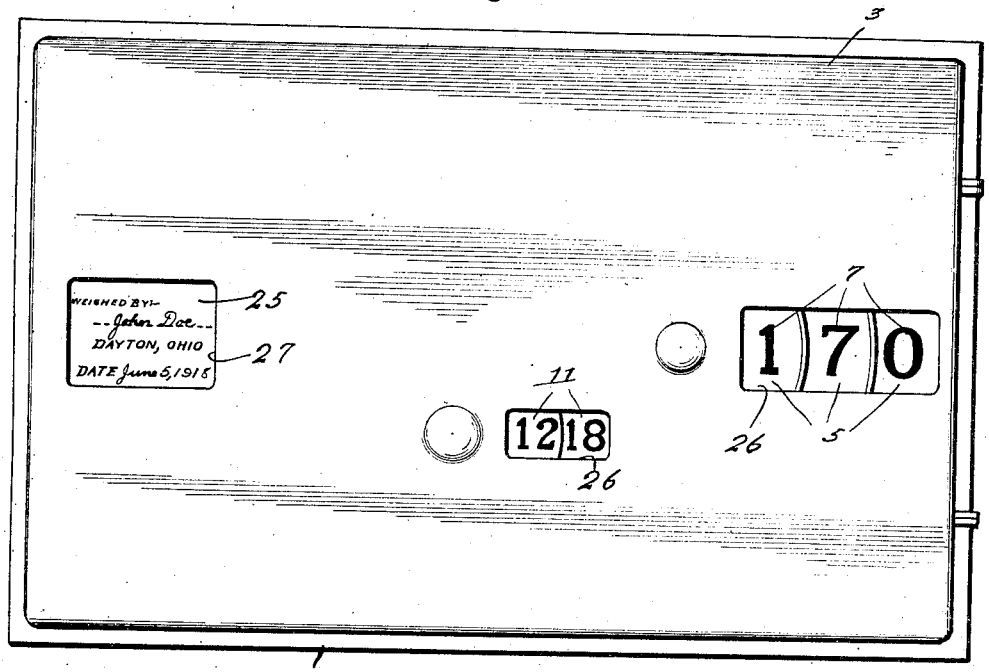
Figure 1 is a plan view of the improved indicator, the sealing card being shown in place.
Figure 3:
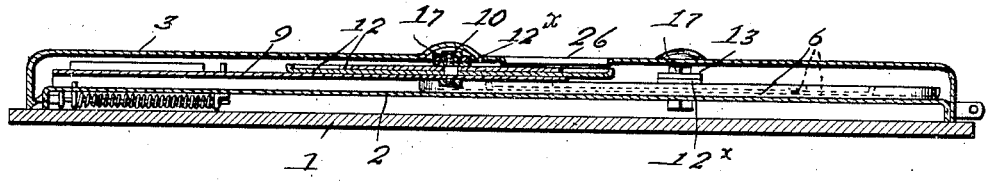
Fig. 3 is a section on the line 3—3 of Fig. 2.

The improved indicator is here shown as comprising a base 1, on which is mounted a plate 2, preferably raised from the base, as shown. A cover 3 is hinged to the base 1, said cover being of the hollow type, so that when in closed position it completely covers and incloses the plate 2. A post 4 is secured in and rises from the plate 2, and mounted for rotation on said post are a series of dials 5. The dials 5, here shown as three in number, comprise circular plates 6 arranged in superimposed relation, the plates being of decreasing diameter in superimposed order, so that a considerable edge margin of each plate is exposed by the plate above it, and these respective edge margins are adapted to receive the numerals, indicated at 7. Preferably each of the two outer plates is dished or recessed, as at 8, to receive the immediately superimposed plate, whereby all of the plates occupy a space equal to the thickness only of the outermost plate.

The plate 2 is formed adjacent to one edge with a raised plate section 9, the plate section 9 overlying the edge of the outermost dial 5, as shown. A post 10 rises from the plate section 9, and on this post 10 are mounted additional dials 11. The dials 11 here shown as two plates 12, are arranged as are the plates 6 of the dials 5, that is in superimposed relation with the uppermost plate 12 of less diameter than the adjacent plate, to provide a margin, on which numerals may be placed.

The particular arrangement of the respective sets of dials, and the number of plates composing the respective sets of dials, is not to be restricted by the showing herein, as it is contemplated that any number of plates may be used, one set or more of dials may be used, and the numerals on the respective plates arranged in any desired order or relation, in order to more particularly provide for the special use for which the indicator is designed. It is of course to be understood that the respective plates of the respective sets of dials may be independently rotated when the cover is raised, and the invention contemplates a means whereby the plate of each set of dials may be locked in fixed relation one to another following their adjustment in order to indicate the desired numerals on the margin. This securing or fixing means is the same for each set of dials, and comprises a plate 12ˣ passed over the reduced end of the posts 4 or 10 as the case may be, and having hinged thereto a movable section 13. The section 13 has a pin 14 projecting therefrom, which when said section is turned down on the plate 12ˣ, it is adapted to enter any one of a series of holes 15, formed in the plates of the respective dials. Following the proper relative adjustment of the dial plates, the holes 15 therein will aline, and when the securing means is in operative position, the post 4 will enter all the holes of the superimposed plates and prevent their independent movement except following the removal of the fastening means. The fastening means is also adapted to lock the dials with relation to the base plate, for which purpose the pin 14 of the fastening means is adapted following its passage through the holes 15 in the plates of a dial to enter an opening 16 in the auxiliary base plate 2, following which the dial plates are not only locked with relation to each other, but with relation to the base plate. By this means when the dials have been set to indicate a particular numeral they are locked through the fastening means described so that they may not be disturbed until access is had to such fastening means. As stated the plate 12ˣ of the fastening means is passed over the reduced upper end of the post on which the dials are rotatably mounted. The plate 12ˣ and therefore the fastening means is secured to the post by a nut 17 secured upon the threaded upper end of the post, and the hinged section 13 of the fastening means is utilized to hold the nut against unscrewing movement through forming a rectangular opening in said section 13. When the plate section is folded down for fastening purposes, the said opening engages the nut and prevents its movement.

The indicator is provided with a lock, whereby the cover when folded down to expose only the selected numerals of the dials may be locked in closed position. This locking means comprises a latch nose 18 secured to a rod 19 mounted between the plate 2 and the base, and held projected in operative relation by a spring 20. The locking means is preferably applied to that edge of the cover remote from the hinge connection of said cover and plate 2, and is arranged centrally of said plate. The latch nose 18 is adapted to engage an appropriate lug 21 formed on the inner side of the cover, as will be seen from the drawings. The plates 2 and 9 are formed with openings 22, through which the upper end of the rod may be accessible, whereby it may be moved by the fingers to withdraw the lock when desired, thus releasing the cover, when further adjustment of the dials by the proper authority is desired. Card receiving ledges 24 are arranged adjacent to the openings 23, so that a card 25 may be applied thereto, which when in position and in engagement with the ledges, as shown in the drawings, will conceal the openings through which the lock is manipulated.

The cover is formed with openings 26 through which the appropriate numerals of the respective dials are visible, and with an opening 27 adapted to aline with the card, heretofore described. The latter opening would permit access to the cover locking means were it not for the card, so that any attempt to unlock the cover to get at the dials to fraudulently make the change therein, must first include the destruction of the card. If such card is stamped or otherwise of special marking, it is apparent that any attempt to unlock the cover will be readily disclosed, so that the tare weight indicated by the indicator may have been changed. As long as the card remains intact it is apparent that the cover is in its originally locked relation with the dials, and that the numerals indicated on the dials as disclosed through the openings in the cover are as they were originally set. The base 1 may indicate any appropriate part of a vehicle, or may be utilized as a base for the indicator proper as desired.

Having thus described the invention what is claimed as new is:

1. A tare indicator comprising a base, a dial mounted thereon and comprising a series of independently rotatable plates having marginal numerals, means for locking the plates with relation to each other and to the base, a cover having hinged connection with the base, said cover being formed with an opening through which certain numerals of the dials are visible, movable locking means for the cover, said cover being formed with an opening through which said locking means is accessible, and a readily-destructible card secured in the base and interposed between said locking means and the opening in the cover through the locking means is accessible, whereby when said card is in place the locking means cannot be reached to unlock the cover except by mutilation of the card.

2. In an indicator, a base, a cover, means to secure the cover in closed position, a threaded post on the base and within the cover, dials mounted to be turned about the base and having apertures off their common center and adapted to be placed in registration, a plate mounted on the post, a nut on the post and against said plate, and a plate hinged to the first-named plate and having an opening to receive said nut and also having a pin to enter the registered apertures in the dials.

In testimony whereof I affix my signature.

BARTON F. McGLOTHLEN.